United States Patent
Lin et al.

(10) Patent No.: US 9,183,583 B2
(45) Date of Patent: Nov. 10, 2015

(54) AUGMENTED REALITY RECOMMENDATIONS

(71) Applicant: A9.com, Inc., Palo Alto, CA (US)

(72) Inventors: Xiaofan Lin, Palo Alto, CA (US); Arnab Sanat Kumar Dhua, Mountain View, CA (US); Douglas Ryan Gray, Mountain View, CA (US); Atul Kumar, Palo Alto, CA (US); Yu Lou, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 103 days.

(21) Appl. No.: 13/893,235

(22) Filed: May 13, 2013

(65) Prior Publication Data

US 2014/0337174 A1 Nov. 13, 2014

(51) Int. Cl.
*G06K 9/00* (2006.01)
*G06Q 30/06* (2012.01)

(52) U.S. Cl.
CPC .................................. *G06Q 30/0623* (2013.01)

(58) Field of Classification Search
CPC .. G06K 9/00; G06K 9/2054; G06F 17/30265; G06F 17/30247; G06Q 30/0601; G06Q 30/0641; G06Q 30/02; G06Q 30/0623
USPC ............ 382/181, 100, 305, 224, 165; 705/26, 705/26.61, 27

See application file for complete search history.

(56) References Cited

U.S. PATENT DOCUMENTS

| 7,246,085 B2* | 7/2007 | Kamon et al. ............... 705/27.2 |
| 2010/0318422 A1* | 12/2010 | Kim et al. .................. 705/14.53 |
| 2014/0201126 A1* | 7/2014 | Zadeh et al. .................... 706/52 |

* cited by examiner

*Primary Examiner* — Ruiping Li
(74) *Attorney, Agent, or Firm* — Hogan Lovells US LLP

(57) ABSTRACT

Various embodiments enable a computing device to perform tasks such as processing an image to recognize text or an object in an image to identify a particular product or related products associated with the text or object. In response to recognizing the text or the object as being associated with a product available for purchase from an electronic marketplace, one or more advertisements or product listings associated with the product can be displayed to the user. Accordingly, additional information for the associated product can be displayed, enabling the user to learn more about and purchase the product from the electronic marketplace through the portable computing device.

20 Claims, 11 Drawing Sheets

AUGMENTED REALITY RECOMMENDATIONS

BACKGROUND

As people are increasingly utilizing a variety of computing devices, including portable devices such as tablet computers and smart phones, it can be advantageous to adapt the ways in which people interact with these devices. Users are accustomed to manually inputting phone numbers to make a phone call, manually typing a web address into a web browser to view a web page, manually typing desired terms for a search, and the like. These tasks are often tedious and time consuming. Various methods to save users time have been offered on various devices such as assigning a phone number to a favorites list, bookmarking a Web address, creating a wish list associated with an electronic marketplace. Augmented reality (AR), or the live view of a physical, real-world environment augmented by computer-generated sensory input, applications have become more popular recently with adoption of smartphones and other portable computing devices. Through computer vision algorithms, some of these AR applications are able to provide users with information related to an environment in both a search and gaming context, thus, enabling users to interact with aspects of the environment that were previously unavailable. As technology evolves and as the features and services offered on portable computing devices evolve and expand, the ways shortcuts and other time saving methods are provided to users is changing.

BRIEF DESCRIPTION OF THE DRAWINGS

Various embodiments in accordance with the present disclosure will be described with reference to the drawings, in which.

DETAILED DESCRIPTION

Figure 1A:
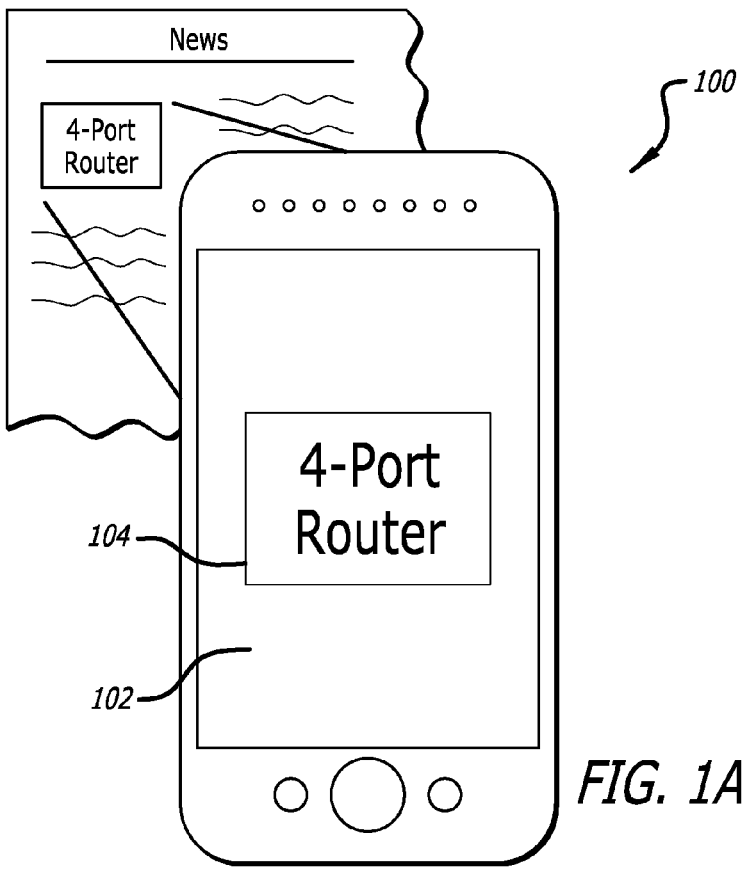
FIGS. 1A and 1B illustrate example views of a user interface of a computing device in accordance with at least one embodiment.

Systems and methods in accordance with various embodiments of the present disclosure may overcome one or more of the foregoing or other deficiencies experienced in conventional approaches to providing users with information via a computing device. In particular, various embodiments enable a device, such as a portable computing device, to perform tasks such as processing an acquired image to recognize text or an object in the image to identify a particular product (or related products) or service associated with the text or object. Upon identifying a particular product or related products, related information can be provided to a user that can enable the user to perform tasks such as purchasing the product(s) from an electronic marketplace.

In at least one embodiment, image information associated with a "live" field of view of a camera can be displayed as part of an augmented reality (AR) application executing on a portable computing device. The image information is analyzed to attempt to recognize text or an object in the live field of view and, in response to recognizing the text or the object as being associated with a product available for purchase from an electronic marketplace, one or more advertisements or product listings associated with the product can be determined and displayed to a user over a portion of the live field of view, at least as displayed on a display screen of the computing device. Upon receiving, from the user, a touch (or other) selection to an advertisement or product listing, additional information for the associated product can be displayed, enabling the user to learn more about and/or purchase the product from the electronic marketplace through the portable computing device, among other such options. Additionally, the product results can be presented to the user(s) in a graphical overlay or a fixed-position product listing as part of the AR application, presented in a personalized webpage for a user's account with an electronic marketplace, or presented in an email communicating identified products and/or their related advertisements or products. As used herein, two products can be considered related when they both belong to the same class of products, are competing products, are the same type of product but made by different companies (different brand), contain overlapping keywords, are two products that are complimentary to each other, and the like.

In one example, an AR application may not be able to accurately identify text or an object in an acquired image (or video). There may, for example, be only a portion of the text or object within the camera's view or some optical aberration could be making it difficult for an optical character recognizer (OCR) or image matching algorithm to determine. Accordingly, upon analyzing the text or object, confidence values for particular text characters or for an object are determined or otherwise obtained. In one example, if confidence scores for the text or the product are all below a threshold score, advertisements or listings for products associated with the highest confidence values among the products can be displayed to the user. In this way, a lack of recognition precision or accuracy can be subtly shielded by presenting potentially related products, or even the correct product, to the user instead of returning an error message, for example.

In at least one embodiment, upon acquiring image information, the image information can be analyzed to recognize the text contained therein for text items, such as a phone number, a physical address, a URL, or a business name. In response to recognizing the text as a text item, a recognition or matching system can lookup information for the text item, such as by analyzing a phone book or address database, to determine a business or service corresponding to a respective phone number, address, URL, business name, or service type. Accordingly, results for the desired business or service, as well as potentially one or more similar businesses or services, related to the recognized text item can be displayed to a user on the computing device for enabling the user to obtain additional information for a respective business or service. In one example, these results can be displayed to the user as advertisements in an advertisement section of the AR application. In another example, if location information is used to determine a location of the computing device when the search is performed, the one or more similar businesses could be local businesses or services related to the phone number, address, URL, or business name.

Further, if the user is associated with account for an electronic marketplace while using the AR application, the identified recognized results can be aggregated with the user's account information. The aggregation of this information can benefit the larger e-commerce system as well as the recognition precision for the user's AR application. For example, the AR application can benefit from integrating the user's past account history from the electronic marketplace, which can potentially improve text and/or object recognition accuracy by knowing the user's interests and habits, prioritizing those interests and habits for that user, and crosschecking recognition results against those interests and associated habits. For example, if a user has an item in a virtual shopping cart of the electronic marketplace, then goes to a store and uses the AR application to recognize text or an object that relates to an item therein, the AR application can determine with a fairly high confidence score that the user is now looking at the same item in the store. In such an example, upon knowing thins information, the electronic marketplace could provide the user with a discount or other incentive to purchase the product from the electronic marketplace instead of the store.

Various other functions and advantages are described and suggested below as may be provided in accordance with the various embodiments.

Figure 1B:
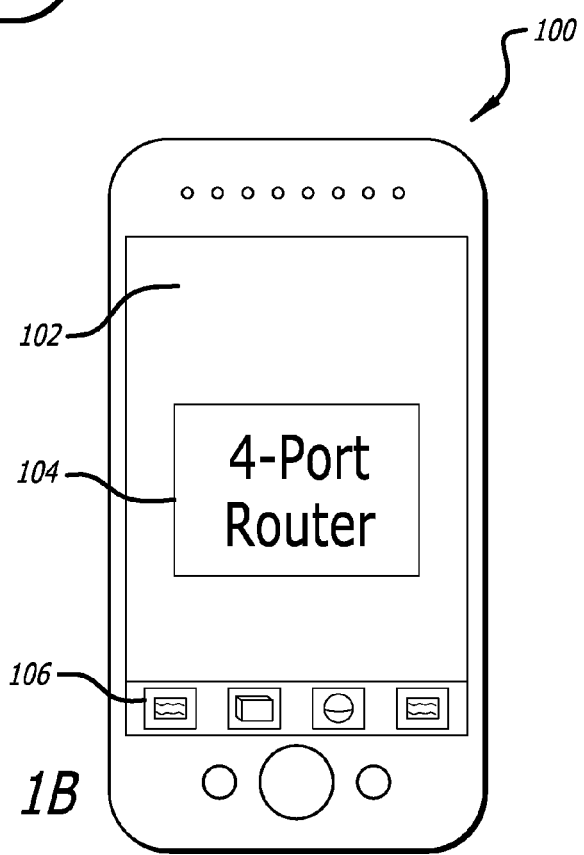

FIGS. 1A and 1B illustrate an example situation showing a recognition interface of an augmented reality (AR) application displaying a live image of an advertisement on a display element 102 in accordance with at least one embodiment. In this example, a user could point an imaging element, such as a camera, of the computing device 100 at text 104 in a magazine, for example, to perform a visual search for obtaining product details for 4-port routers, information about a particular brand, or information for purchasing a router through an electronic marketplace. In this example, FIG. 1A shows a computing device 100 capturing the text 104 "4-port router" to perform a visual search thereof. In one embodiment, upon obtaining an image or image information, one or more portions of the same having properties that indicate the presence of text can be identified. An application executing on the computing device can automatically run or send the image information to a remote location to run an optical character recognition (OCR) algorithm to recognize text 104 of the "4-port router" advertisement. The OCR algorithm may, in various embodiments, include a machine vision algorithm and other image preprocessing algorithms making use of various techniques. Further, it should be understood that the methods and techniques discussed herein are not limited to text recognition applications. For example, other image matching, similarity search, and the like algorithms can be used to recognize objects in addition to recognizing text.

In response to recognizing "4-port router" and its relationship to a product available for purchase from the electronic marketplace, search results associated with the text can be displayed to the user of the computing device 100. In this example, "4-port router" refers to a class of devices for which there are many brands and types with different features. Accordingly, instead of displaying a single specific product result, results for various 4-port routers of different brands and features can be displayed to the user. FIG. 1B shows a view the computing device 100 with an advertisement, virtual shelf, or product preview bar 106 that includes product results for four different 4-port routers. In this example, various 4-port routers are displayed to the user as a result of recognizing text associated with a broad category, as opposed to a single specific model 4-port router of a specific brand.

In order to determine which products to display to the user, the text 104 for "4-port router" could be submitted to an ad network and the ad space in the product preview bar 106 can be provided to the highest bidders of the keyword "router" or "port" or a combination of the two as a way to monetize this ad space, for example. In another example, each of the products in the product preview bar 106 could be associated with products available for purchase from the electronic marketplace where clicking on a respective product would navigate the user, via the computing device 100, to a product purchasing page for the user to purchase a respective router. The product preview bar 106, in various examples, can display items that the user has recently recognized in previous visual searches, viewed in the electronic marketplace, listed in a wish list or an electronic shopping cart. Further, the product preview bar 106 can display items associated keywords from a user's browser or purchase history, display items as suggested by one or more algorithms based at least in part on words being recognized in the image, and the like. Additionally, items from local stores or markets geographically close to the user could also be provided for display on the product preview bar 106, for example. These local stores or markets could also bid on certain keywords or pay for their listing to appear before other listings for a particular product or service class.

In at least one embodiment, the text or object does not need to be accurately recognized in order to provide product results for display. Accordingly, product results for products from the electronic marketplace can be displayed on the product preview bar 106 when a word is only partially recognized (or recognized with an associated low confidence score). Besides providing the user with product results that are potentially relevant, displaying partially recognized results can subtly shield imperfections in the recognition process. In this instance, instead of being frustrated with a lack of visual search results, a user could scroll through the product results on the product preview bar 106. In one instance, the AR application may actually recognize the text or object that the user desires, but may only recognize part of the text or object, due to glare or blur, for example, or recognize the text or object with an associated low confidence score. Accordingly, as a result of the low confidence score, the product corresponding to the partially recognized text or object could be displayed in the product preview bar 106 where the user could see and select the desired product, in this instance.

For example, if the user is attempting to have the AR application recognize the word "skateboard," but for whatever reason the application can only recognizes "skate," the product results in the product preview bar 106 could include roller skates, ice skates, skateboards, and the like. In this example, however, a skateboard does appear in the product preview bar 106 and the user could use this result to focus their search on skateboards. In another example, conditions for image capture may be less than ideal resulting in all the confidence scores for each object or group of text returned by the recognition engine to be below a confidence score threshold. In this example, the AR application could return a number of products with the highest confidence scores, even though they are below the confidence threshold. Such a situation would be indicative of a recognition problem, as opposed to a clear confidence score winner with multiple confidence score results below the threshold score which would be characteristic of an ideal match.

Figure 2A:
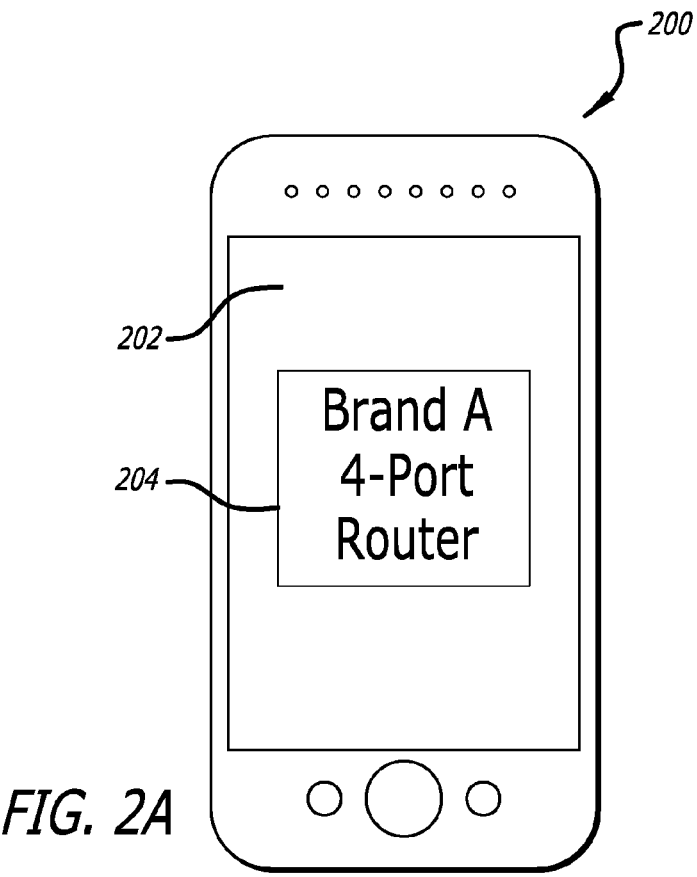
FIGS. 2A and 2B illustrate example views of a user interface of a computing device in accordance with at least one embodiment.
Figure 2B:
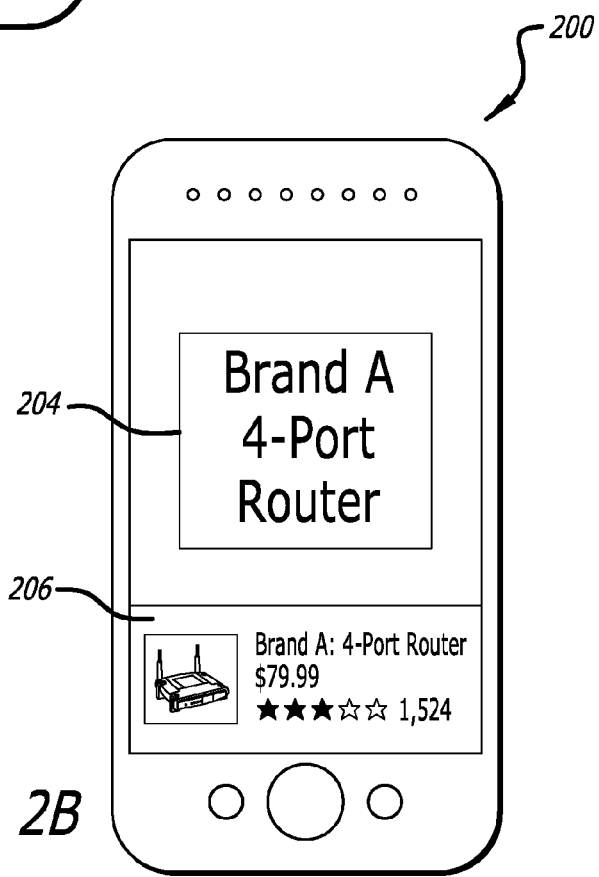

FIGS. 2A and 2B illustrate another example of a recognition interface for an AR application displaying a live image of an advertisement on a display element 202 in accordance with at least one embodiment. In this example, the user has pointed the imaging element of the computing device 200 computing device at text 204 of an advertisement to perform a visual search for obtaining product details or purchasing information for a 4-port router from Brand A. In this example, FIG. 2A shows the computing device 200 capturing the text "Brand A 4-port router" to perform a visual search thereof as described above. This example is similar to FIGS. 1A-1B except, in this instance, the visual search is for a specific product, namely Brand A's 4-port router. In this example, upon recognizing the text 204 and identifying that the text 204 is associated with a specific product, not just a class of products as described above, product information for the specific product is displayed to the user. FIG. 2B illustrates an example of such product information displayed in product information bar 206 that could be presented to the user, in one example. In this example, the product information bar 206 may include the full name of the product, the price of the product, product reviews, and a link to purchase the product or a virtual button to add the product to a wish list of virtual shopping cart.

Figure 3:
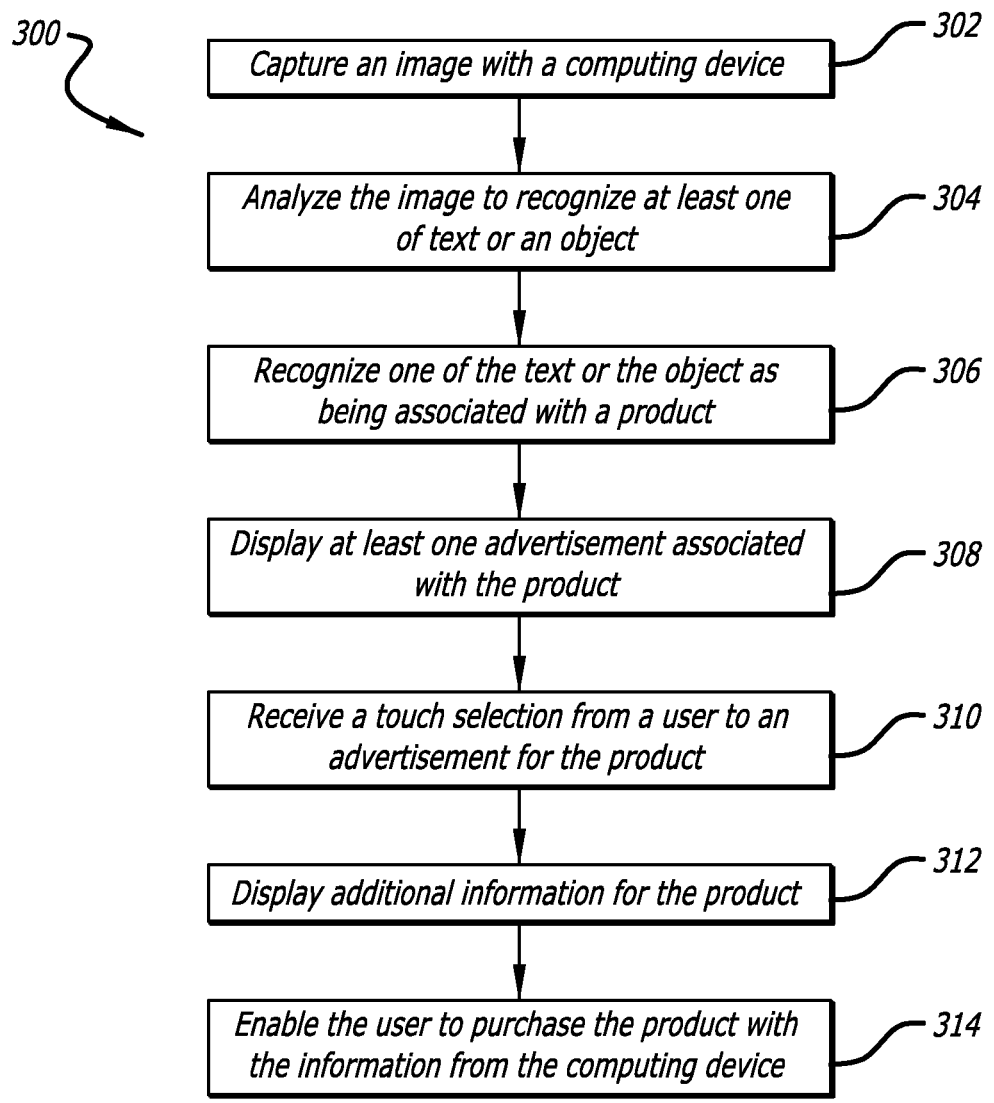
FIG. 3 illustrates an example process that can be used in accordance with at least one embodiment.

FIG. 3 illustrates an example process 300 for providing users with product information with an augmented reality application on a computing device, in accordance with various embodiments. It should be understood that, for any process discussed herein, there can be additional, fewer, or alternative steps performed in similar or alternative orders, or in parallel, within the scope of the various embodiments unless otherwise stated.

In this example, an image or image information (e.g., a video stream) in a live field of view is captured 302. In various embodiments, the image or image information is obtained from a camera application of the portable computing device. In one instance, hovering the device over an object facing the camera will cause the camera to automatically capture at least one image or record a sequence of images. In another instance, the camera requires input from a user in order to capture the image, such as by the user selecting an icon on a touch screen, for example. The imaging sensor can also be in a continuous image capturing mode. This can, however, be energy intensive, so a user may select various options or circumstances in which to have the device continually run in an image capturing and processing mode or when to have it disabled. For example, a setting could be selected where the continuous capturing and processing mode is automatically turned off when the battery is drained to a particular level.

Accordingly, the image is analyzed or processed 304 to recognize any text or object contained therein. In response to recognizing 306 the text or the object as being associated with a product available for purchase from an electronic marketplace, one or more advertisements or product listings associated with the product (or a related product) can be displayed 308 over a portion of the live field of view. The products can, in one example, be displayed to the user through graphical overlay associated with an augmented reality (AR) application on the computing device or through a fixed-position product listing or a popup window that could also be associated with the AR application. In one example, recognizing the text or object includes determining a confidence score for the text or object in the image as being a match to a respective product. Accordingly, the text or object are considered a match if the confidence score is above a threshold confidence score and a product with such a confidence score will be chosen for display to the user. Alternatively, in the instance where there are no confidence scores above the threshold score, a determined number of products with the highest associated matching confidence scores can be displayed to the user. The confidence scores could be based on different factors or a different combination of the same factors.

Upon receiving, from a user, a selection 310 of an advertisement for a product, additional information for the product is displayed 312, enabling 314 the user to learn more about and purchase the product from the electronic marketplace. In one example, the user can purchase the product though the AR application from the computing device or the user could save the product, such as by adding it to a wish list, and purchasing it at another time through another computing device. Various other approaches can be used as well as discussed or suggested elsewhere herein. Additionally, it should be understood that the methods and techniques discussed herein are not limited to text recognition applications. For example, other image matching, similarity search, and the like algorithms can be used to recognize objects in addition to recognizing text. Further, although FIGS. 1-3 discuss the recognition of related products, listings or advertisements for one or more servicers or businesses associated with a recognized product could also be displayed to the user within the scope of various embodiments.

As discussed elsewhere herein, the product results can also be provided to users through multiple means other than directly through the AR application. For example, a user having an account with an electronic marketplace linked to the AR application could be presented with products related to past visual searches when the user navigates to a webpage associated with the electronic marketplace. The products could come in the form of suggestions or recently viewed items, but also as fixed-position advertisements or product listings. Further, email advertising campaigns could also be pushed to users with information for related search performed through the AR application. Various other approaches and product information delivery means can be used as well as discussed or suggested elsewhere herein.

Figure 4A:
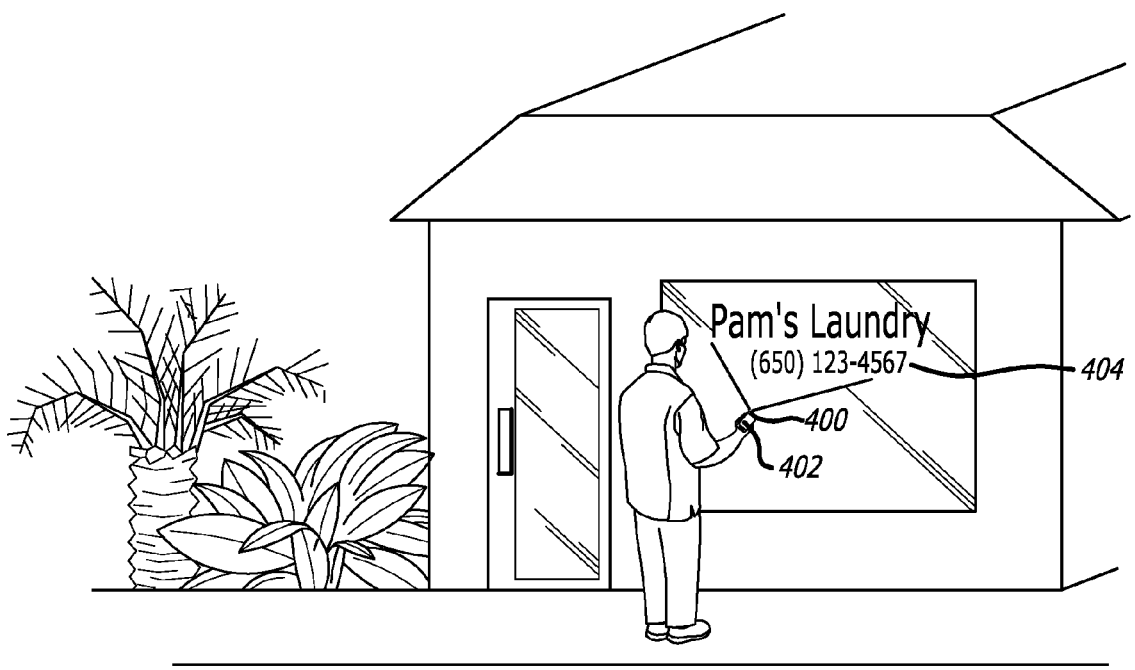
FIGS. 4A-4C illustrate an example situation showing a user obtaining information computing device that can be used to implement aspects of various embodiments.
Figure 4B:
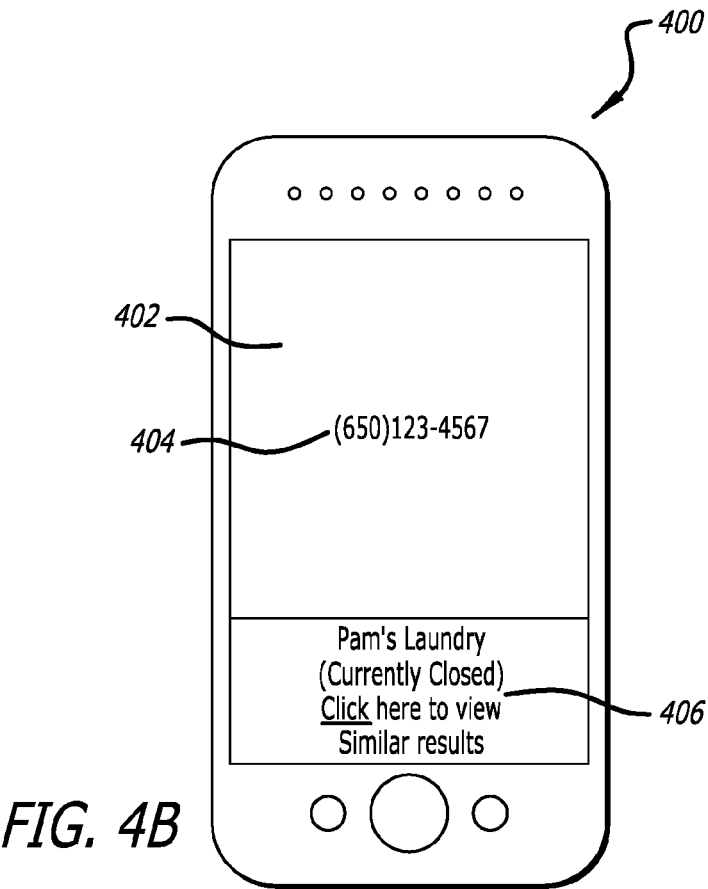
Figure 4C:
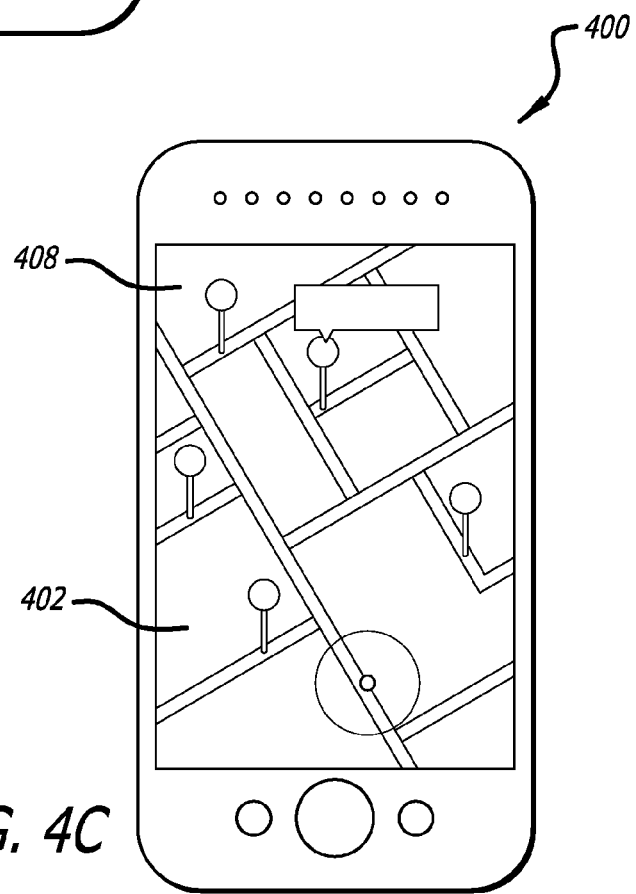

FIGS. 4A-4C illustrate an example situation of a user using a computing device 400 to reverse look up information for a business and/or related businesses using a phone number, URL, or name of the business, in accordance with various embodiments. In at least one embodiment, a recognized phone number, URL, or business name can be checked against a database to reverse look up information for the business associated with the recognized phone number, URL, or business name. Accordingly, with the information for the business, more information can be provided to user of that business and, additionally, information for related businesses either in the advertisement section of the AR application or as search results.

FIG. 4A illustrates an example situation 400 in which a user is attempting to recognize text 404 on a window of a business, which in this example is a dry cleaner, Pam's Laundry. Although a smart phone is shown, it should be understood that various other types of electronic or computing devices that are capable of determining and processing input can be used in accordance with various embodiments discussed herein. These devices can include, for example, tablet computers, notebook computers, desktop computers, personal data assistants, electronic book readers, video gaming controllers, and portable media players, among others.

In this example, the user is walking down the street to drop of a few items for dry cleaning, but when they arrive, Pam's Laundry is closed. In accordance with various embodiments, instead of manually typing the name of the business into a search engine of device's web browser to obtain additional information for Pam's Laundry, such as hours of operation, or information for other dry cleaners, the user could point the camera of the computing device 400 at either the text associated with a phone number, business name, or business URL to recognize and subsequently reverse lookup information for the business stored in a phone book or address book database or through a web search using the business's name.

In this example, the user has pointed the camera of computing device 400 at text 404 for the business's phone number and a system in communication with the AR application has reverse looked-up the business associated with the phone number. Accordingly, FIG. 4B shows the phone number displayed on the display 402 of the computing device with information for Pam's Laundry displayed in informational bar 406. In this example, upon determining a business associated with the phone number, information for the business (Pam's Laundry) can be retrieved by performing a web search or by searching a map, business listing, or other database. In this example, the information for Pam's Laundry displayed on informational bar 406 includes the name of the business, the current status of the business that indicates that it is currently closed, and a link for the user to view results for businesses similar to Pam's Laundry in the user's vicinity. Other information such as the address, hours of operation, customer reviews, product or service prices, and the like could also be displayed in informational bar 406.

Accordingly, in this example, the user has clicked on the link to view other businesses similar to Pam's Laundry near the user. FIG. 4C shows an example map view 408 that could be presented to the user upon clicking the link to view other businesses similar to Pam's Laundry in the user's vicinity. In this example, the user is presented with the location of businesses similar to Pam's Laundry on a map relative to their current location, thus, enabling the user to quickly identify the next closest open dry cleaner so that they can drop off their dry cleaning. Accordingly, the user's default dry cleaner was closed; however, the user was able to use the AR application on their computing device 400 to identify the next closest open dry cleaner without inputting or manually searching for the alternative dry cleaner themselves.

Figure 5:
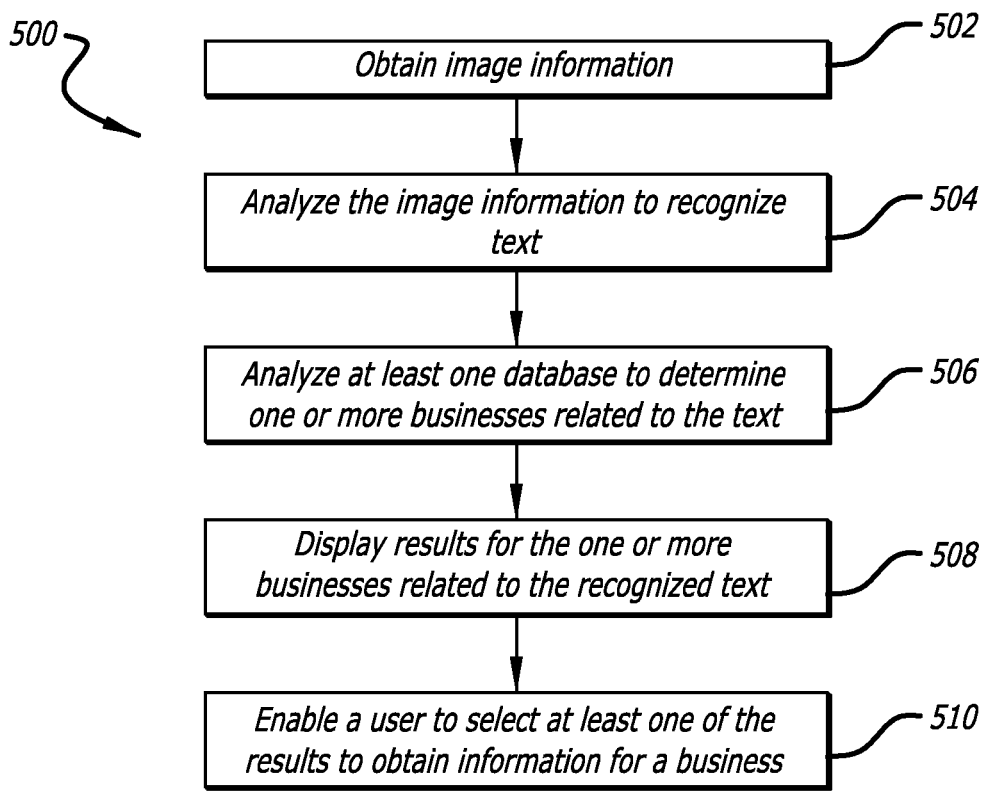
FIG. 5 illustrates another example process that can be used in accordance with at least one embodiment.

FIG. 5 illustrates an example process 500 for providing users with additional information using an imagining sensor of a computing device in accordance with various embodiments. In this example, upon obtaining image information 502 containing text, the image information is analyzed 504 to recognize the text. In response to recognizing the text as a phone number, address, URL, or business name, a phonebook/address database is analyzed 506 to determine a business or service corresponding to the phone number, address, URL, business name, or service. Accordingly, results for the desired business, service, and/or one or more similar businesses or services related to the recognized text are displayed 508 to a user on the computing device to enable the user 510 to obtain additional information for a respective business or service. In one example, these results can be displayed to the user as advertisements in an advertisement section of the AR application. Various other approaches can be used as well as discussed or suggested elsewhere herein.

Figure 6:
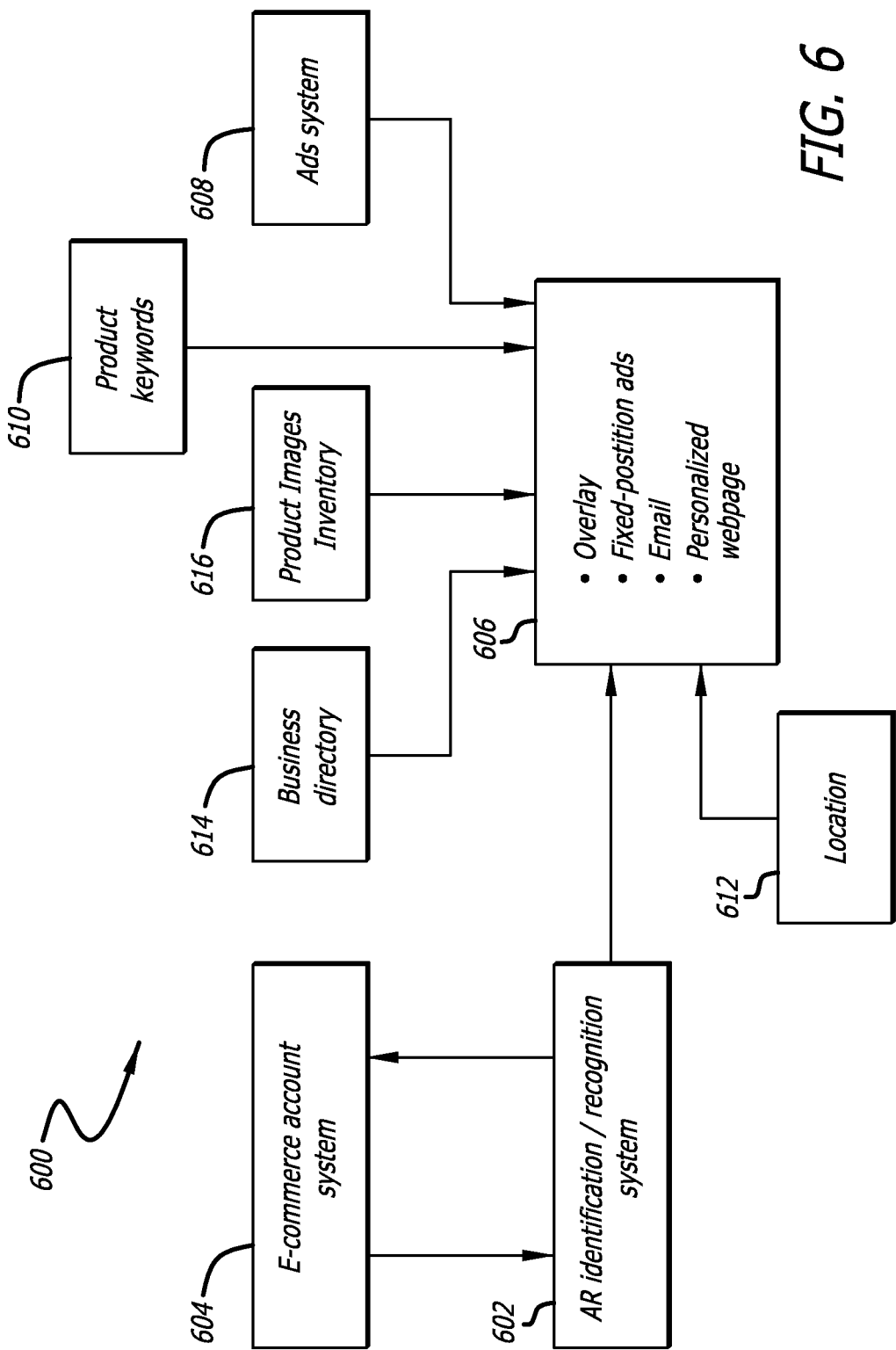
FIG. 6 illustrates system diagram that can be used in accordance with at least one embodiment.

In at least one embodiment, if a user utilizing an augmented reality application, in accordance with various embodiments discussed herein, on their computing device has an account with an electronic marketplace, the AR application can be linked to the larger e-commerce system for an electronic marketplace to provide mutual benefits to both the AR application and the user's account with the electronic marketplace. FIG. 6 illustrates an example block diagram 600 for providing product information through multiple channels to users.

In this example, product information 606 can be presented to users of an AR application as an overlay, a popup window, a fixed-position advertisement, and the like. Further, this product information 606 can be delivered to users via email, which could include product promotions and suggestions related to the user's interests, and also via a personalized webpage associated with a user's account with the electronic marketplace. Multiple data sources can be used to ensure that the product information 606 provided to users is relevant to the particular user the information is provided to. For example, these data sources can include information specific to the user, such as recognized keywords from the AR system 602, information associated with a user's electronic marketplace account 604, and a user's current location 612. Further, these data sources can include information to crosscheck data coming in from the AR system 602, the user's electronic marketplace account 604, and location 612, such as product keywords 610, data from an advertisement system 608, a business directory 614, a product images inventory 616, and the like.

In this example, information from a user's electronic marketplace account 604 may include past product search terms from manual searches, browsing history, pervious purchases, items in a wish list, and the like. Data from the AR system 602 may include previous visual searches, items the user has clicked on that are related to a particular search, and items purchased through the AR application. The location 612 includes location data from a source such as a global position system (GPS), map application data, WIFI triangulation, IP address lookup, and the like. For example, a user is probably not interested in results for businesses that are across the country. The business directory 614 can include information complied for local, regional, national, or international businesses. This information may include business names, addresses, phone numbers, hours or operation, customer reviews, industry and product/service information, and the like. Product images inventory 616 may include images for products available for purchase through the electronic marketplace. In one example, histogram descriptors for products are stored in the product images inventory 616 for image matching. For example, these descriptors can be compared against incoming visual product searches from, for example, the AR application to determine a similarity between descriptors for identifying a product in the incoming image. Product keywords 610 can be used to crosscheck against and verify whether text recognized in a visual search matches one or more product keywords stored for a respective product in the product keyword data store 610. Further, advertisement information from the advertisement system 608 is used as an input for displaying information when providing the user with an advertisement.

Each of these data sources can be used to determine and verify a product to present to the user, determine the product information 606 associated with the product, and deliver product information 606 that is appropriate given the user's preferences, tastes, habits, and current location or context. Accordingly, the product information 606 can be displayed to the user as an overlay, a popup window, or a fixed-position advertisement in the AR application or via email, which could include product promotions and suggestions, and also via a personalized webpage associated with a user's account with the electronic marketplace.

Figure 7:
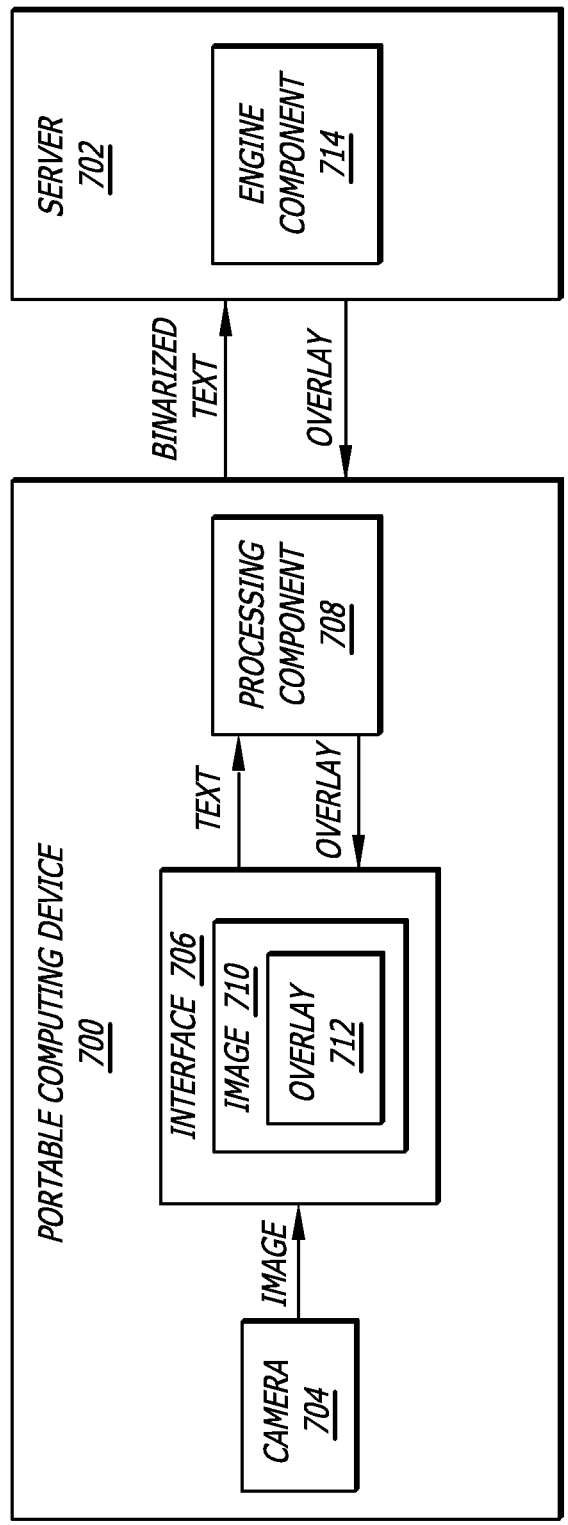
FIG. 7 illustrates an example system for providing overlays based on a detected image in a live field of view of a camera, in accordance with at least one embodiment.

FIG. 7 illustrates an example system for providing augmented reality overlays based on a detected image in a live field of view of a camera, in accordance with an embodiment. As shown in FIG. 7, a portable computing device 700 is in communication with a server 702. The portable computing can device can be a mobile phone or any computing device that can be operated by a user. The server can be any type of server such as an application server, a web server, etc.

The portable computing device in this example includes a camera 704, an interface 706 (e.g., a display element) that displays the field of view of the camera, and a processing component 708. The camera can include a lens and an image sensor that converts an optical image into an electrical signal. The portable computing device can be aimed in different directions and the interface can display an image 710 of the current/active field of view being captured by the camera. It should be noted that the image is not a snapshot of the current/active field of view being captured by the camera; rather, the image is the current (or live) rendering of what the camera is being pointed at.

The processing component processes the image in the active field of view of the camera to detect text in the image. For example, the processing component can implement algorithms that detect and recognize the location of text in the image, and the region of the image that includes the text can be cropped to create a region of cropped text. The region of cropped text can be binarized. Thereafter, the region of binarized text is communicated to the server. Alternatively, in accordance with an embodiment, a grey scale image, color image or any other image (cropped or otherwise not cropped) can be communicated to the server (or remain on the portable computing device) for further processing. Additionally, it should be understood that instead of communicating the binarized text to the server, at least a portion or all of the further processing could also be done on the portable computing device 700.

Figures 8A, 8B:
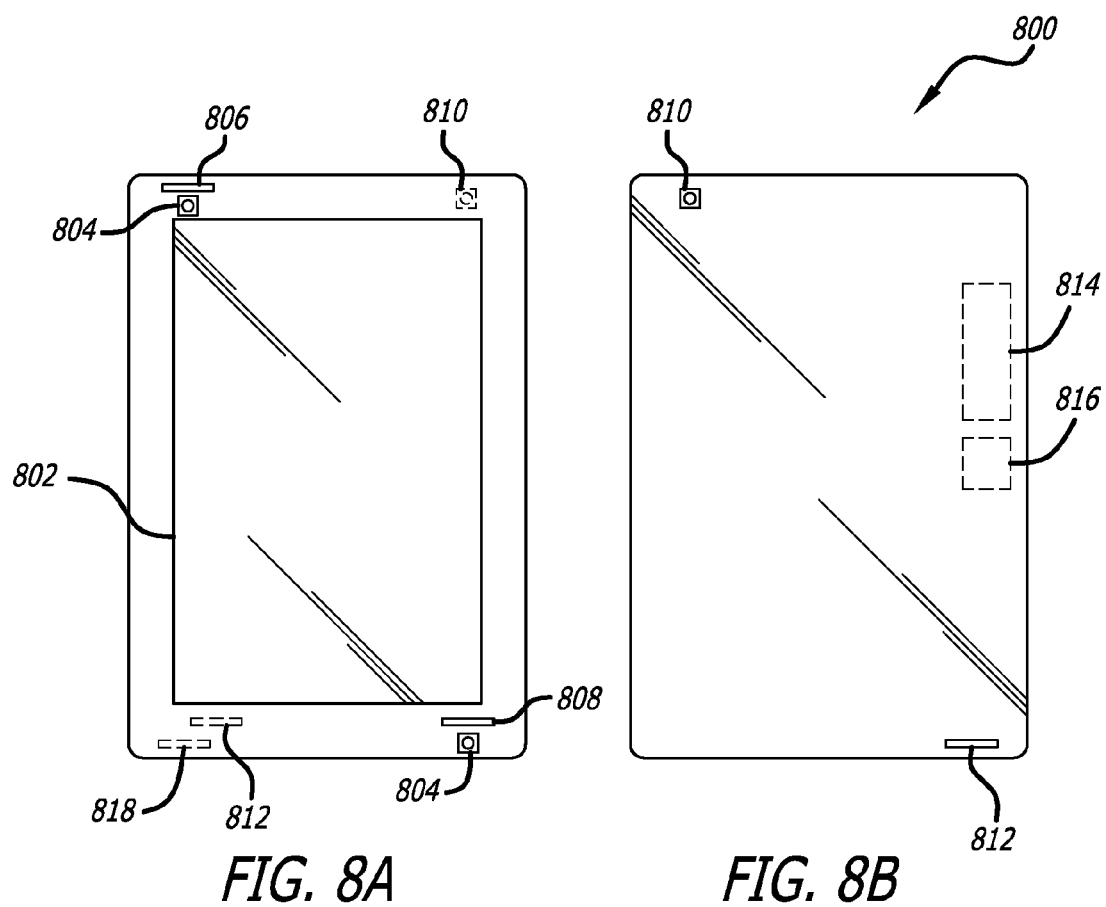
FIGS. 8A and 8B illustrate an example computing device that can be used to implement aspects of various embodiments.

FIGS. 8A and 8B illustrate front and back views, respectively, of an example computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
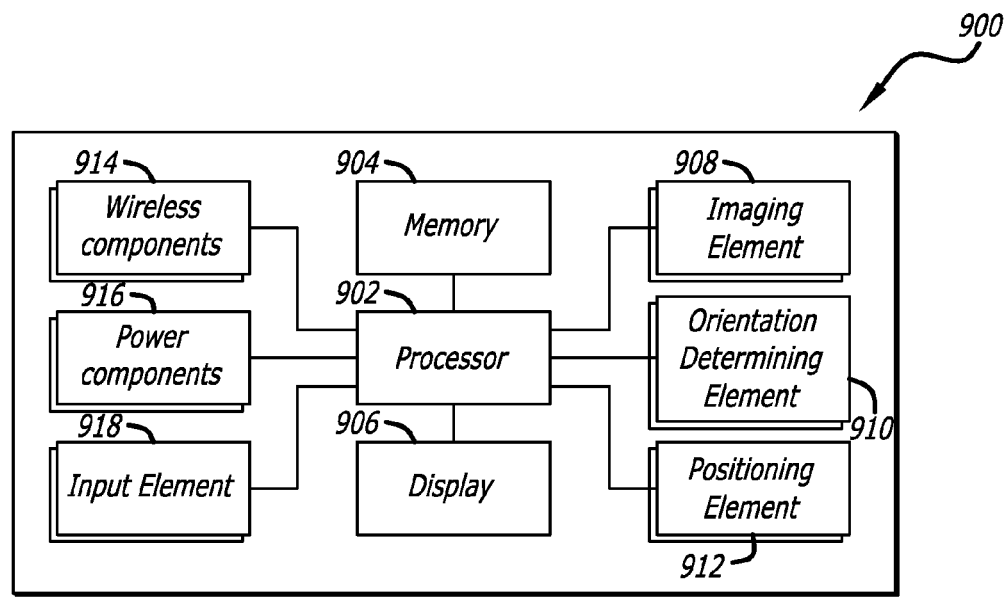
FIG. 9 illustrates example components that can be used with a device such as that illustrated in FIGS. 8A and 8B.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 10:
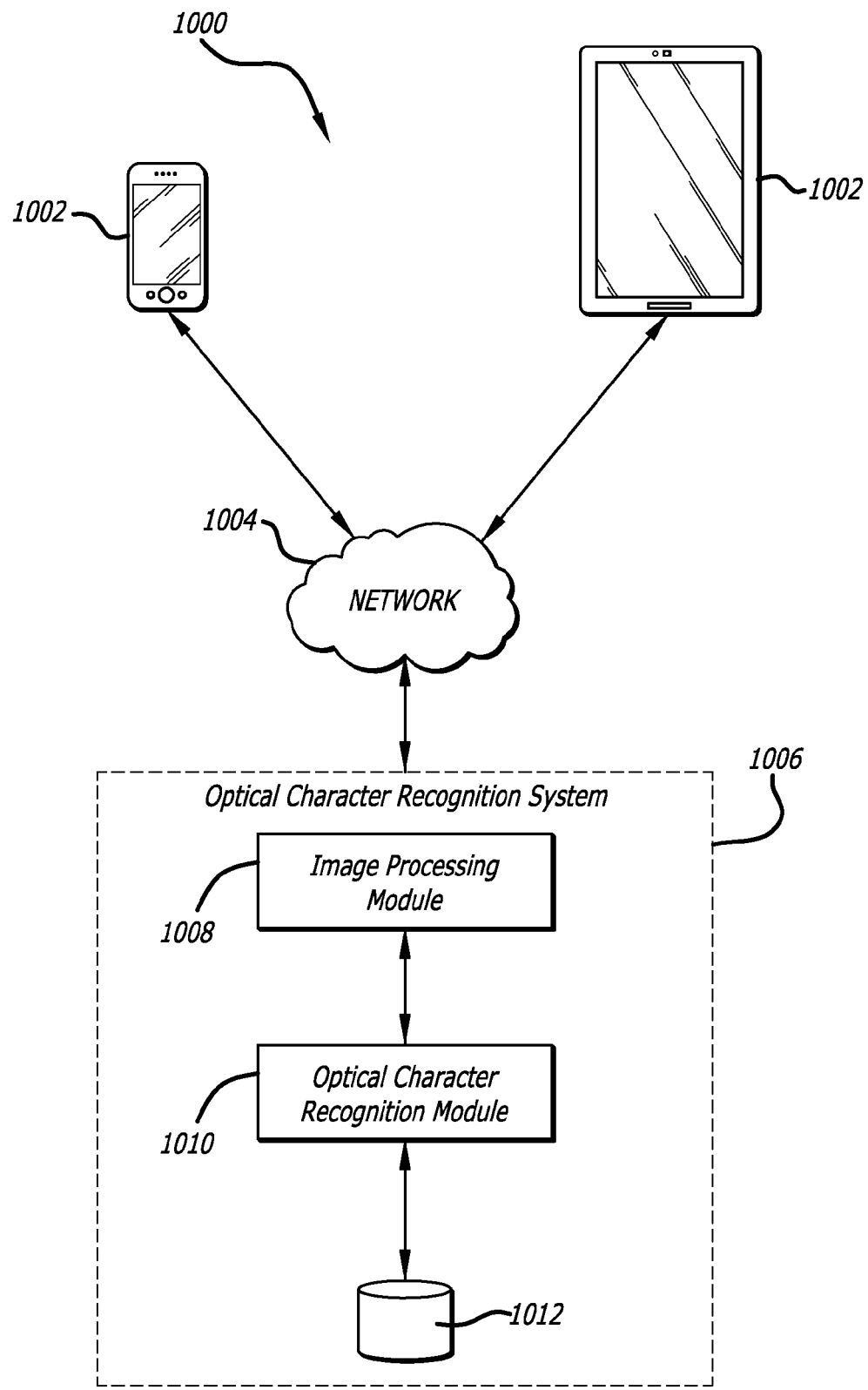
FIG. 10 illustrates an example environment in which various embodiments can be implemented.

FIG. 10 is an example environment 1000 in which a user can utilize a computing device to recognize text, in accordance with various embodiments. It should be understood that the example system is a general overview of basic components, and that there can be many additional and/or alternative components utilized as known or used in the art for recognizing text in multiple images. In this example, a user is able to utilize a client device 1002, such as a personal computer, tablet computer, smart phone, and the like, to access an Optical Character Recognition system or service 1006 over at least one appropriate network 1004, such as a cellular network, the Internet, or another such network for communicating digital information. The client device 1002 can capture one or more images (or video) of text and send the images to the Optical Character Recognition system or service 1006 over the at least one appropriate network 1004. The Optical Character Recognition system 1006 includes an image-processing module 1008 that can apply different operators or techniques to pre-process the images before submitting the images to one or more optical character recognition modules 1010. Examples of the operators include a Laplacian-of-Gaussian filter, thresholding filters, and so forth, which enhance or mitigate different characteristics of the images. Examples of these characteristics include intensity, blurriness, and so forth. After pre-processing, the one or more recognition engines of the optical character recognition module 1010 concurrently recognizes text from the image to produce multiple recognized text outputs. In at least one embodiment, a processor can analyze the recognized text using a database 1012 of words in order to improve the recognition. The database 1012 includes a set of words which the processor can search for matches corresponding to words present in the recognized text. At least a portion of these tasks can be performed on a portable computing device or by using at least one resource available across a network as well. In at least some embodiments, an OCR application will be installed on the client device 1002, such that much of the processing, analyzing, or other such aspects can be executed on the client device. Various processing steps can be performed by the client device 1002, by the Optical Character Recognition system 1006, or a combination thereof. Therefore, it should be understood that the components and capabilities of the Optical Character Recognition system 1006 could wholly or partly reside on the client device 1002.

Figure 11:
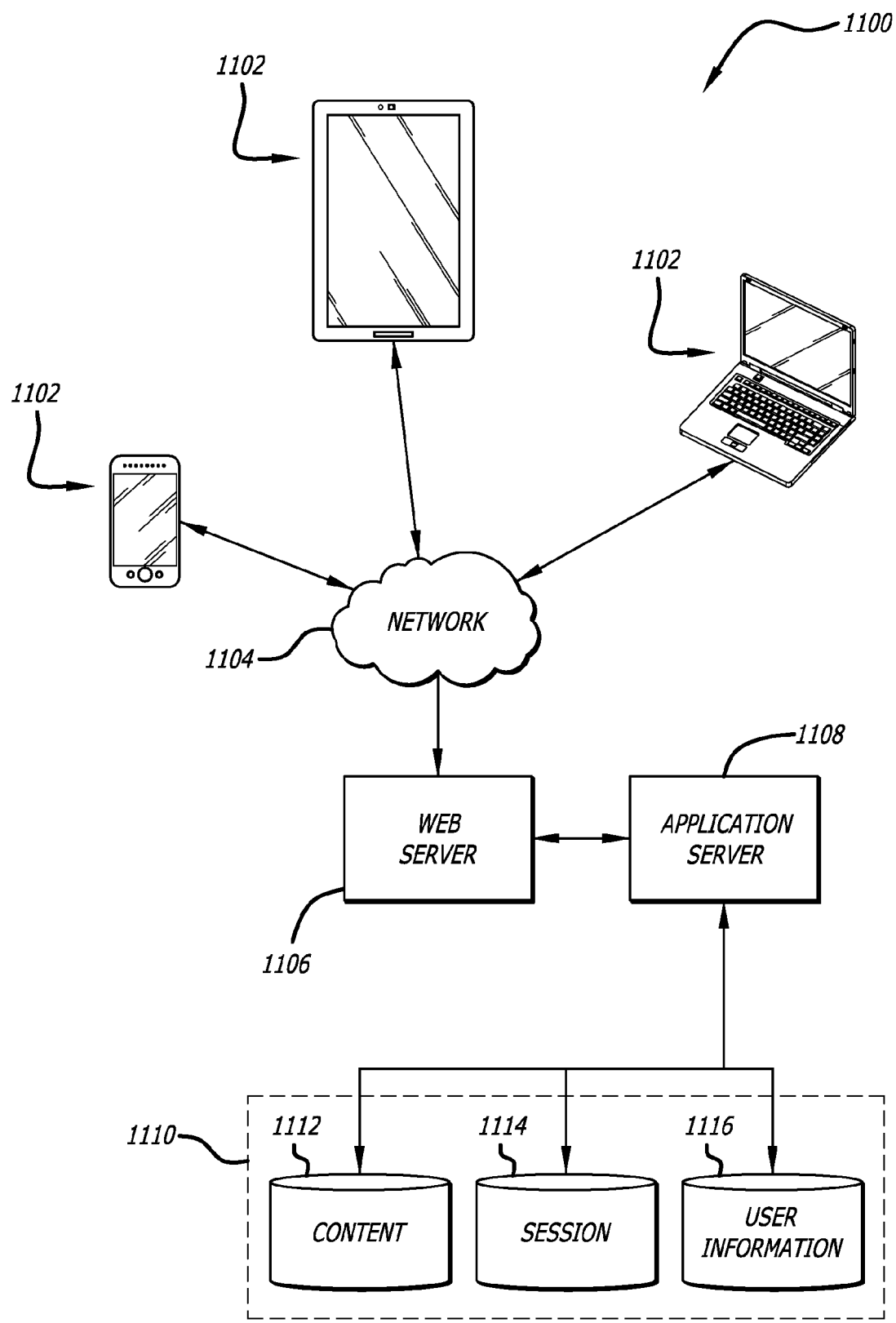
FIG. 11 illustrates another environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:
    capture image information corresponding to a field of view of a camera of a computing device, at least a portion of the image information being displayed on a display element of the computing device;
    analyze the image information to recognize at least one of text or an object represented in the image information and in the field of view of the camera;
    determine at least one of the text or the object as being associated with a product listing;
    display, in a graphical overlay over a portion of the image information corresponding to the field of view of the camera and concurrently being displayed on the display element, the product listing identifying an item available for purchase from an electronic marketplace;
    receive a selection of the item;
    display additional information for the item; and
    enable purchasing of the item listed in the product listing from the electronic marketplace.

2. The non-transitory computer-readable storage medium of claim 1, wherein analyzing the image information to recognize at least one of the text or the object includes determining a confidence score indicating a level of confidence that the at least one of the text or the object is associated with the product available for purchase from the electronic marketplace.

3. The non-transitory computer-readable storage medium of claim 2, wherein the product listing includes only one product when the confidence score is above a threshold score.

4. The non-transitory computer-readable storage medium of claim 2, wherein recognizing at least one of the text or the object includes comparing the at least one of the text or the object to products from at least one of previously recognized products for a user, user browser history, user purchase history, or stated user preferences.

5. The non-transitory computer-readable storage medium of claim 2, wherein the product listing includes multiple products and the product when the confidence score for the product is below a threshold score.

6. The non-transitory computer-readable storage medium of claim 5, wherein the multiple products include at least one of an advertisement or a related product available for purchase from the electronic marketplace.

7. The non-transitory computer-readable storage medium of claim 5, wherein the multiple products are displayed based at least in part on one of the multiple products having at least one keyword in common with the product, stated user preferences, user browser history, or user purchase history.

8. A computer-implemented method, comprising:
    under the control of one or more computer systems configured with executable instructions,
        acquiring image information corresponding to a field of view of a camera of a computing device, the image information being displayed on a display element of the computing device, the image information including a representation of an object;
        determining the representation of the object as being associated with a product available for purchase from an electronic marketplace;
        determining at least one related product associated with the product available for purchase;
        displaying, in a graphical overlay over a portion of the image corresponding to the field of view of the camera and concurrently being displayed on the display element, the at least one related product;
receiving a selection of the at least one related product;
displaying additional information associated with the at least one related product; and
enabling purchasing of the at least one related-product from the electronic marketplace.

9. The computer-implemented method of claim 8, wherein the product is identified by at least one of recognizing text associated with the product or comparing the image information to images stored for products available for purchase from the electronic marketplace using an image matching algorithm.

10. The computer-implemented method of claim 8, wherein the at least one related product is displayed on at least one of an overlay, an advertisement, or a fixed-position listing.

11. The computer-implemented method of claim 8, further comprising:
providing a user with the at least one related product in at least one of an email or a product listing displayed in a personalized webpage of the electronic marketplace associated with an account of the user.

12. The computer-implemented method of claim 8, wherein identifying a product in the acquired image information includes determining a confidence score indicating a level of confidence that the identified product is the product available for purchase from the electronic marketplace.

13. The computer-implemented method of claim 12, wherein the at least one related product is the product when the confidence score is above a threshold score.

14. The computer-implemented method of claim 12, wherein the at least one related product includes multiple products and the product when the confidence score is below a threshold score.

15. The computer-implemented method of claim 14, wherein the multiple products include at least one of an advertisement or a related product available for purchase from the electronic marketplace.

16. The computer-implemented method of claim 15, wherein the multiple products are displayed based at least in part on one of the multiple products having at least one keyword in common with the product, stated user preferences, user browser history, or user purchase history.

17. A computing device, comprising:
a processor;
a display element; and
memory including instructions that, when executed by the processor, cause the computing device to:
acquire an image corresponding to a field of view of a camera of a computing device, the image including a representation of text;
analyze the image to recognize the representation of the text;
analyze at least one data source to determine a business associated with the representation of text;
display, in a graphical overlay over a portion of the image corresponding to the field of view of the camera and concurrently being displayed on the display element, at least one of results for one or more businesses or results for one or more products related to the business associated with the representation of text; and
enable a user to select at least one of the results to obtain additional information for the business.

18. The computing device of claim 17, wherein the representation of the text is at least one of a phone number, a uniform resource locator (URL), an address, a name of the business.

19. The computing device of claim 17, wherein the results of the one or more businesses are displayed in a map view on the display element.

20. The computing device of claim 17, wherein the results for one or more businesses includes at least one of an advertisement or a related product or service available for purchase from the one or more businesses.

* * * * *